US010942844B2

(12) United States Patent
Barbou-Des-Places et al.

(10) Patent No.: US 10,942,844 B2
(45) Date of Patent: Mar. 9, 2021

(54) RESERVED MEMORY IN MEMORY MANAGEMENT SYSTEM

(71) Applicant: Apple Inc., Cupertino, CA (US)

(72) Inventors: Francois Barbou-Des-Places, Los Altos, CA (US); Joseph Sokol, Jr., San Jose, CA (US); Simon Douglas, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 334 days.

(21) Appl. No.: 15/257,799

(22) Filed: Sep. 6, 2016

(65) Prior Publication Data

US 2017/0357450 A1  Dec. 14, 2017

Related U.S. Application Data (60) Provisional application No. 62/348,773, filed on Jun. 10, 2016.

(51) Int. Cl.
  *G06F 12/02* (2006.01)
  *G06F 3/06* (2006.01)
  *G06F 9/44* (2018.01)
  *G06F 9/445* (2018.01)

(52) U.S. Cl.
  CPC .......... *G06F 12/023* (2013.01); *G06F 3/0622* (2013.01); *G06F 3/0637* (2013.01); *G06F 3/0679* (2013.01); *G06F 9/44* (2013.01); *G06F 9/445* (2013.01); *G06F 12/0246* (2013.01); *G06F 12/0253* (2013.01); *G06F 2212/152* (2013.01); *G06F 2212/7203* (2013.01)

(58) Field of Classification Search
  CPC ...... G06F 3/0604; G06F 3/0631; G06F 3/064; G06F 3/0647; G06F 3/0665; G06F 3/0673; G06F 2212/152; G05F 12/023
  See application file for complete search history.

(56) References Cited

U.S. PATENT DOCUMENTS

| 6,016,530 | A  | 1/2000 | Auclair et al. |
| 6,598,134 | B2 | 7/2003 | Ofek et al. |
| 6,639,872 | B1 | 10/2003 | Rein |
| 6,804,763 | B1 | 10/2004 | Stockdale et al. |
| 7,225,211 | B1 | 5/2007 | Colgrove |
| 7,310,699 | B2 | 12/2007 | Sinclair |
| 7,464,222 | B2 | 12/2008 | Matsunami et al. |
| 7,555,575 | B2 | 6/2009 | Kaneda |

(Continued)

FOREIGN PATENT DOCUMENTS

EP  1 492 006 B1  10/2007

OTHER PUBLICATIONS

Jiang, Song et al., "CLOCK Pro. An Effective Improvement of the CLOCK Replacement", In Proceedings of USENIX Annual Conference, (2005), 14 pages.

*Primary Examiner* — Jane Wei (74) *Attorney, Agent, or Firm* — Womble Bond Dickinson (US) LLP (57) ABSTRACT

A memory management system, such as a virtual memory manager that manages a virtual memory space that includes volatile memory (e.g. DRAM) and non-volatile memory (e.g., flash memory) creates a reserved portion of memory in the volatile memory for at least one user application in one embodiment, and that reserved portion can also store content that it restricted to read only permission within the non-volatile memory.

25 Claims, 7 Drawing Sheets

(56) References Cited

U.S. PATENT DOCUMENTS

| | | |
|---|---|---|
| 7,788,220 B1 | 8/2010 | Auchmoody et al. |
| 7,827,358 B2 | 11/2010 | Watson et al. |
| 7,908,236 B2 | 3/2011 | Modha et al. |
| 8,010,747 B2 | 8/2011 | Van Riel |
| 8,296,510 B2 | 10/2012 | Radke et al. |
| 8,463,825 B1 | 6/2013 | Harty |
| 8,732,424 B2 | 5/2014 | Lee et al. |
| 8,751,725 B1 | 6/2014 | Gangadharan et al. |
| 9,477,431 B1 | 10/2016 | Chen |
| 2002/0104097 A1* | 8/2002 | Jerding ............ G06F 8/60 725/115 |
| 2003/0005223 A1 | 1/2003 | Coulson et al. |
| 2003/0056058 A1 | 3/2003 | Veitch |
| 2004/0044861 A1 | 3/2004 | Cavallo et al. |
| 2004/0225835 A1 | 11/2004 | Coulson |
| 2005/0097287 A1 | 5/2005 | Melament |
| 2007/0061539 A1 | 3/2007 | Nonaka |
| 2007/0106842 A1 | 5/2007 | Conley et al. |
| 2007/0168627 A1 | 7/2007 | In et al. |
| 2008/0027905 A1 | 1/2008 | Jensen |
| 2008/0215834 A1 | 9/2008 | Dumitru |
| 2008/0275928 A1 | 11/2008 | Shuster |
| 2008/0288714 A1 | 11/2008 | Salomon |
| 2009/0089343 A1 | 4/2009 | Moore |
| 2009/0276588 A1 | 11/2009 | Murase |
| 2010/0037009 A1 | 2/2010 | Yano |
| 2010/0082936 A1 | 4/2010 | Hobbet et al. |
| 2010/0132053 A1* | 5/2010 | Chishima ............ G06F 21/74 726/30 |
| 2010/0325352 A1 | 12/2010 | Schuette |
| 2010/0332725 A1 | 12/2010 | Post et al. |
| 2010/0332730 A1 | 12/2010 | Royer et al. |
| 2011/0035548 A1 | 2/2011 | Kimmel |
| 2011/0082967 A1 | 4/2011 | Deshkar et al. |
| 2011/0138112 A1 | 6/2011 | Chiang et al. |
| 2011/0145489 A1 | 6/2011 | Yu et al. |
| 2011/0153931 A1 | 6/2011 | Bell, Jr. |
| 2011/0179219 A1 | 7/2011 | Ma et al. |
| 2011/0185105 A1* | 7/2011 | Yano ............ G06F 12/0246 711/103 |
| 2011/0276744 A1 | 10/2011 | Sengupta et al. |
| 2011/0283035 A1 | 11/2011 | Sutardja |
| 2011/0283045 A1 | 11/2011 | Krishnan et al. |
| 2012/0017043 A1 | 1/2012 | Aizman et al. |
| 2012/0059972 A1 | 3/2012 | Chen |
| 2012/0096217 A1 | 4/2012 | Son et al. |
| 2012/0166749 A1 | 6/2012 | Eleftheriou |
| 2012/0179882 A1 | 7/2012 | Bernhard, III et al. |
| 2012/0297117 A1 | 11/2012 | Jo |
| 2013/0031298 A1 | 1/2013 | Tan et al. |
| 2013/0046920 A1 | 2/2013 | Ryu et al. |
| 2013/0060999 A1 | 3/2013 | Chiu et al. |
| 2013/0080703 A1 | 3/2013 | Kumagai et al. |
| 2013/0159597 A1 | 6/2013 | Cheong |
| 2013/0219116 A1 | 8/2013 | Wang et al. |
| 2013/0226997 A1* | 8/2013 | Lee ............ G06F 15/167 709/203 |
| 2014/0189281 A1 | 7/2014 | Sokol, Jr. |
| 2014/0195571 A1 | 7/2014 | Wang et al. |
| 2014/0267103 A1* | 9/2014 | Chaudhri ............ G09G 5/14 345/173 |
| 2015/0363311 A1* | 12/2015 | Munetoh ............ G06F 12/0638 711/103 |
| 2017/0010817 A1* | 1/2017 | Lim ............ G06F 3/0604 |
| 2017/0249174 A1* | 8/2017 | Tsirkin ............ G06F 9/45558 |

\* cited by examiner

RESERVED MEMORY IN MEMORY MANAGEMENT SYSTEM

This application claims the benefit of U.S. Provisional Patent Application No. 62/348,773, filed on Jun. 10, 2016, which application is incorporated herein by reference.

BACKGROUND OF THE INVENTION

This disclosure relates generally to memory management in data processing systems such as computers, smart phones, etc.

Memory management in a data processing system is often performed by software that can be considered part of an operating system software that manages software processes and device hardware and provides common services for application programs. These common services can include virtual memory management, scheduling of processes or threads, resource allocation among application programs, input/output control, etc. Memory management has become important in part because many modern devices (e.g., iPhone or iPad from Apple, Inc. of Cupertino, Calif.) often concurrently run many processes or applications in the background while one application program (e.g., a web browser) is the foreground application. For example, while the web browser executes as the foreground application (receiving and responding to user inputs), a set of applications, such as a media player application for playing music, an email application, a text messaging application, etc. and a set of daemons can also be executing or at least consuming memory resources even when they are not executing (such as idle or suspended applications). Moreover, many mobile devices, such as smartphones, often have much less DRAM memory (used to store software code and data for executing or idle, suspended applications) than desktop or laptop computers and no hard drive as a backing store (for a swap space), and thus such mobile devices, after being used for an extended period of many days, can have very link free (unused) DRAM available for allocation to a newly launched application or process, and this can force the memory management system to reclaim memory before the newly launched application can be provided DRAM memory. As a result, the launching by a user of the newly launched application can appear to be sluggish to the user.

SUMMARY OF THE DESCRIPTION

Methods and systems described herein can be implemented by data processing systems, such as smart phones, tablet computers, desktop computers, laptop computers, smart watches, wearable accessories, and other data processing systems and other consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine readable media.

The embodiments described herein provide a memory management system that manages a memory space (e.g., a virtual memory space) that includes volatile memory (e.g. DRAM) and non-volatile memory (e.g., flash memory) and creates a reserved portion of memory in the volatile memory for at least one predetermined user application, and in one embodiment, that reserved portion can also store content (e.g. software libraries) that is restricted to read only permission within the non-volatile memory.

A method in one embodiment can include the following operations performed by a memory management system: reserving a portion of volatile memory for use by at least one predetermined application, wherein the predetermined application is one of a plurality of applications on a data processing system that includes the memory management system and the reserving creates a reserved portion; storing in the reserved portion content that is restricted as read only (no writing permitted) in non-volatile memory, wherein the content is read from the non-volatile memory and written into the reserved portion; and storing, in response to the predetermined application being launched, one or more of software code or data of the predetermined application in the reserved portion. In one embodiment, when the predetermined application is launched, at least a portion of the software code or data of the predetermined application is stored in a free portion of the volatile memory if available, as indicated by a free page queue, before storing other portions of the software code of data of the predetermined application in the reserved portion. In one embodiment if, when the predetermined application is launched, no free portions of the volatile memory are available, as indicated by a free page queue, and insufficient free portions of the reserved portion are available, as indicated by a reserved page queue, then the memory management system reclaims memory pages within the reserved portion instead of waiting for the system to reclaim memory pages within other portions of the volatile memory. In one embodiment, the reclaiming of memory pages within the reserved portion is performed without performing a page out from the memory pages within the reserved portion to the non-volatile memory. In one embodiment, the reserving of the reserved portion is performed initially at boot time of the data processing system, and the content that is restricted as read only includes read only software libraries (which can be code signed) or other read only files, hi one embodiment the predetermined application is predetermined either: (a) at compile time of an operating system (OS) that includes the memory management system or (b) dynamically at run time based on either a user input/selection or an OS selection, and wherein the predetermined application is a user application that runs in user memory space. In one embodiment, the predetermined application is a camera application that operates with an imaging system to capture still images and/or video.

A method according to an embodiment described herein can include the following operations performed by a memory management system: determining from a free page queue, in response to a request for one or more free pages of memory in volatile memory, whether a memory page is available for use by an application; providing to the application a free page if the free page queue is not empty; determining, in response to determining the free page queue is empty or has insufficient pages for the request, if the application is classified as a predetermined application; providing to the predetermined application a free page from a reserved page queue for a reserved portion of volatile memory. In one embodiment of this method, content that is restricted as read only in non-volatile memory is also stored in the reserved portion and this content can include software libraries that are stored in the non-volatile memory and are code signed (for security) and contain one or more code signatures that can be validated before executing the software. In one embodiment of this method, if insufficient free portions are available from both the reserved portion and the rest of the volatile memory then when the predetermined application is launched (or becomes the foreground app) the memory management system reclaims memory pages within the reserved portion instead of waiting for the system to reclaim memory pages from other portions of the volatile memory.

The methods and systems described herein can be implemented by data processing systems, such as smartphones, tablet computers, desktop computers, laptop computers, smart watches, audio accessories, and other data processing systems and other consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine readable media.

The above summary does not include an exhaustive list of all embodiments in this disclosure, AD systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
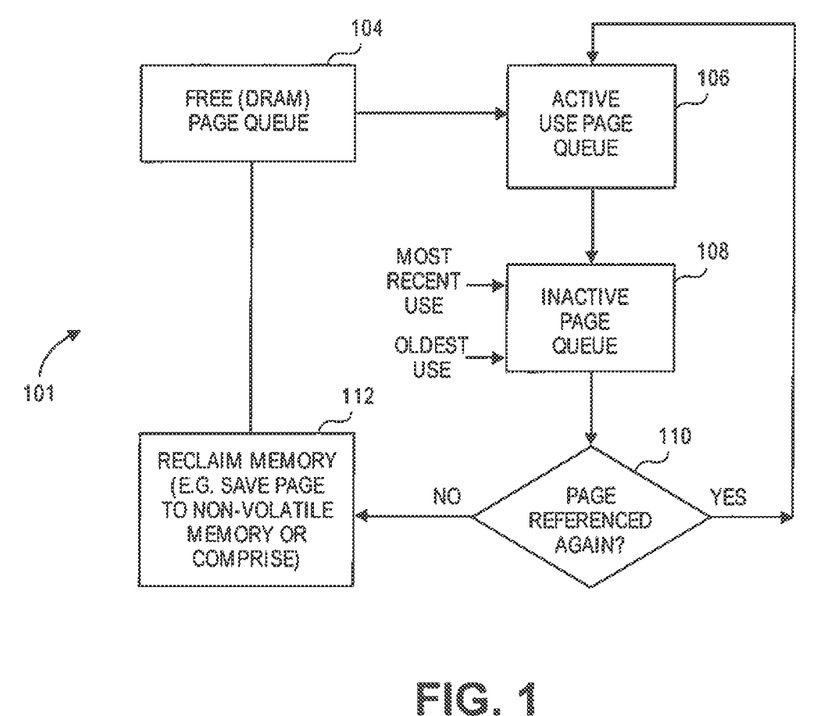
FIG. 1 is a diagram which shows a flow of memory pages through various states or phases in a memory management system.

A memory management system can manage a memory system that includes at least volatile memory such as DRAM (dynamic random access memory) and a non-volatile memory, such as flash memory or a hard drive or both flash memory and a hard drive in a virtualized memory space. The memory management system can use any one of a variety of ways to reclaim volatile memory, such as DRAM memory including, for example, a reference counting system or other techniques known in the art. In addition, the memory management system can use techniques known in the art that attempt to prevent the free page queue from becoming empty. For example, a technique known or referred to as "Jetsam" can be used to manage memory pressure in order to prevent the free page queue from becoming empty or nearly empty. Examples of such memory management techniques are described in U.S. Pat. No. 7,827,358 and U.S. Publication No. 2012/0179882, both of which are incorporated herein by reference. In addition, the memory management system can use the separate page queues that allow the memory management system to allocate and reclaim memory while keeping track of which pages are free and which pages are actively being used and which pages are inactive. Referring now to FIG. 1, a flow of memory pages through various states or phases over time is shown as a data processing system runs and as user applications are launched (and create data and store data, etc.). When a data processing system initially boots up, the free page queue 104 usually contains many free pages of memory which are available for use and can be allocated to application programs and other processes upon requests from the application programs and processes. When the memory management system allocates or otherwise provides one or more pages of memory that were free for use by a program, it moves an identifier for those one or more pages onto the active use page queue 106. In one embodiment, the identifier for a page can be a virtual memory address for a location in the kernel address space, and that identifier is moved from the free page queue 104 onto the active use page queue 106 when the page is allocated or otherwise provided to an application or process. In one embodiment, the page queues, such as the active page queue 106 and the inactive page queue 108 can be an ordered list which is sorted by recency of use which in this case is a read access or a write access to the memory page. As is known in the art, the memory pages can become inactive because, for example, the application has become idle (e.g., the user has not used the application in over a week). Memory management systems can utilize the inactive page queue 108 by moving pages from the active page queue 106 onto the inactive page queue 108 over time. Again, the pages in the inactive page queue 108 can be sorted from most recent use to oldest use so that the memory management system can take actions to free up memory pages. In one embodiment, the transfer of a page from the active page queue 106 to the inactive page queue 108 can involve a reset of a "referenced" flag to a "not" state to indicate that the page is now considered inactive. Before an inactive page is reclaimed a check is made whether the page has been referenced again in decision block 110. It will be appreciated that in one embodiment, whenever a page in the inactive page queue 108 is referenced again because the page has become active again, the page is then moved back to the active page queue 106. On the other hand, if the oldest used page in the inactive page queue 108 has not been referenced again indicating that it has not become active again then it can be reclaimed in operation 112 by using any one of a variety of ways to reclaim memory, such as compressing the data in the DRAM or into non-volatile storage or saving the page to non-volatile storage or using Jetsam to kill an application and potentially also cause the saving of one or more pages to non-volatile memory. After the one or more pages are reclaimed by operation 112, the identifier for the page is returned back to the free page queue 104, and the process can continue over time. It will be understood that the term "page" refers to a chunk of memory which is usually a fixed size memory block.

Figure 2:
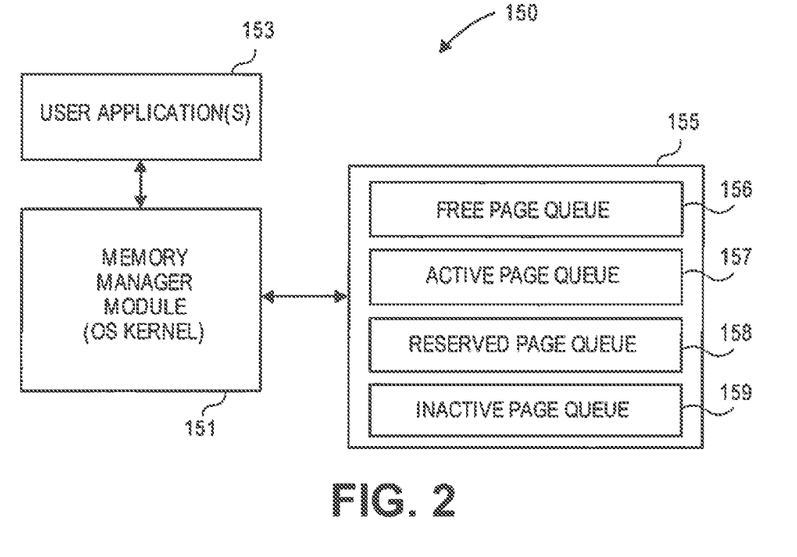
FIG. 2 shows an example of a memory management system in one embodiment which uses a set of page queues.

FIG. 2 shows an example of one embodiment described herein which utilizes a set of queues which can include, in addition to the page queues shown in FIG. 1, a reserved page queue 158. The data processing system 150 shown in FIG. 2 includes a memory manager module 151 which can he part of an operating system, and can be part of the kernel of the operating system. As is known in the art, the operating system provides various services to a plurality of user applications 153. One of these services is memory management. As the applications 153 are launched and run, they request and require memory in order to perform their operations. As is known in the art, this memory is needed to store executing software code as well as data of the user applications during runtime. The set of page queues 155 is used as described herein to attempt to ensure that a sufficient amount of free memory pages are available at any one point in time as the system runs. The set of page queues 155 can include a free page queue 156, which is similar to the free page queue 104, an active page queue 157 which is similar to the active page queue 106, an inactive queue 159 which is similar to the inactive page queue 108 and a reserved page queue 158 which will be described further herein.

Figure 3:
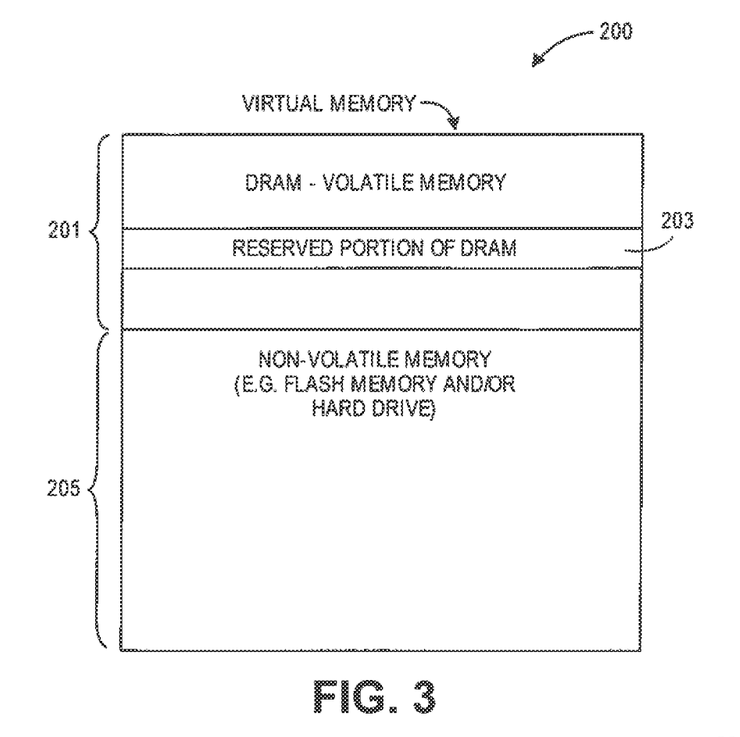
FIG. 3 shows an example in one embodiment of a virtual memory which includes a reserved portion of the volatile memory which in one embodiment can be DRAM.

A generalized example of a method according to one embodiment will now be described while referring to FIGS. 3, 4, and 5. The method 250 shown in FIG. 4 can be performed in the system of FIG. 2 which includes a set of queues 155, and memory pages in those queues can migrate over time in the manner shown in FIG. 1 with the addition of a reserved page queue 158.

Figure 4:
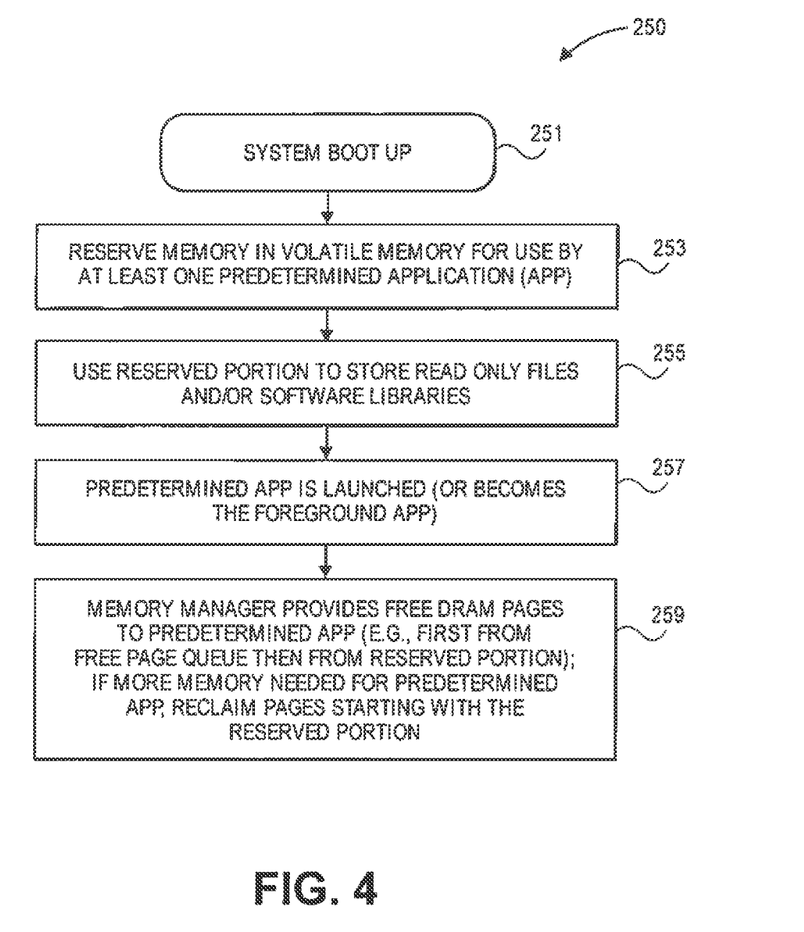
FIG. 4 is a flowchart which illustrates a method according to one embodiment described herein.
Figure 5:
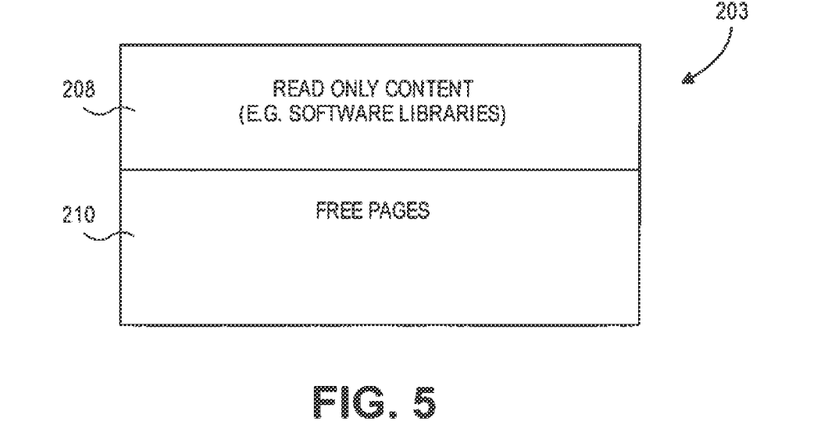
FIG. 5 shows an example of the reserved portion of volatile memory after certain content has been stored into that portion.

Referring now to FIG. 4, method 250 can begin at system boot up 251 in which the operating system boots up the data processing system using techniques and methods known in the art. At some point during the boot up process, the operating system can cause the memory management system to reserve memory in volatile memory, such as DRAM, for use by at least one predetermined application program in operation 253 shown in FIG. 4. A specific instance of application software or application program can be referred to as an application program or application or app, which are used interchangeably herein. In one embodiment, the predetermined application or app can be a camera app which is configured to operate with an imaging system to capture still images or video or both. In one embodiment, the predetermined application is predetermined at compile time of the operating system and is identified by a flag or other identifier to indicate that it has a special status among all of the other application programs in that a reserved portion of the DRAM memory space is reserved for use by the predetermined program and potentially also by one or more of daemons and plug-ins and software libraries that are used by the predetermined application. FIG. 3 shows a virtual memory space 200 which includes two portions for the two different types of memory in the system. The volatile memory portion 201 includes the reserved portion 203. This reserved portion is reserved by operation 253 in FIG. 4 and is reserved for use by predetermined app when it is launched or when it becomes the foreground app. The other portion of the virtual memory space 200 includes the non-volatile memory which in one embodiment can be flash memory or a hard drive or a combination of the flash memory and a hard drive or other non-volatile storage. The non-volatile memory 205 and the volatile memory 201 together make up the virtual memory space 200 which can be controlled by a memory management system, such as the memory manager module 151 shown in FIG. 2.

Referring back to FIG. 4, in operation 255, the memory management system can allow for the use of the reserved portion to store read only files, such as software libraries, which are stored with read only permissions in the non-volatile memory 205. This can be permitted when the predetermined app has not been launched or the user has caused it to quit, etc. Over time, the use of the reserved portion by such read only files can be allowed to grow by the memory management system. Because these files are read only, the memory management system can cause the pages used in the reserved portion by such read only files to be quickly purged and allocated for use by the predetermined app. FIG. 5 shows an example of the reserved portion 203 which includes both free pages 210 as well as a section of the reserved portion in which read only content has been stored. The read only content 20 can be, in one embodiment, software libraries which are stored with read only permissions in the non-volatile memory, such as non-volatile memory 205. When those software libraries are stored in the reserved portion of DRAM 203 the permissions in one embodiment can be relaxed to allow writing to that DRAM in the reserved portion (e.g., to store temporary data used by the software libraries during execution). While this content 208 is stored in reserved portion, it can also have an execute permission to allow the execution of the executable software code in the software libraries. However, the pages written to will not be considered "dirty" because the executable software will not be modified and written back to non-volatile memory, and hence there is no need to page out the read only content back to the non-volatile memory. Referring back FIG. 4, in operation 257 the predetermined app has been launched by the user or becomes the foreground app. In response to the launching of the predetermined app, the memory manager in operation 259 provides free volatile (e.g. DRAM) pages to the predetermined app. In one embodiment, the memory manager can first provide free pages from the free page queue if available and then provide memory pages from the reserved portion. In one embodiment, if more memory is needed for the predetermined app, then the memory manager can reclaim pages starting with the reserved portion before reclaiming pages from the remainder of the volatile memory 201. As noted herein the reserved portion can also be used for plug-ins or daemons that operate with the predetermined app in one embodiment such that these plug-ins or daemons are given the same privilege to use the reserved portion as the predetermined app.

The method shown in FIG. 4 can be performed in conjunction with conventional memory reclamation techniques which can be performed asynchronously relative to the method shown in FIG. 4. Such memory reclamation techniques are described in U.S. Pat. No. 7,827,358 and U.S. Publication No. 2012/0179882 and U.S. patent application Ser. No. 13/730,211, filed Dec. 28, 2012, all of which are incorporated herein by reference.

Figure 6:
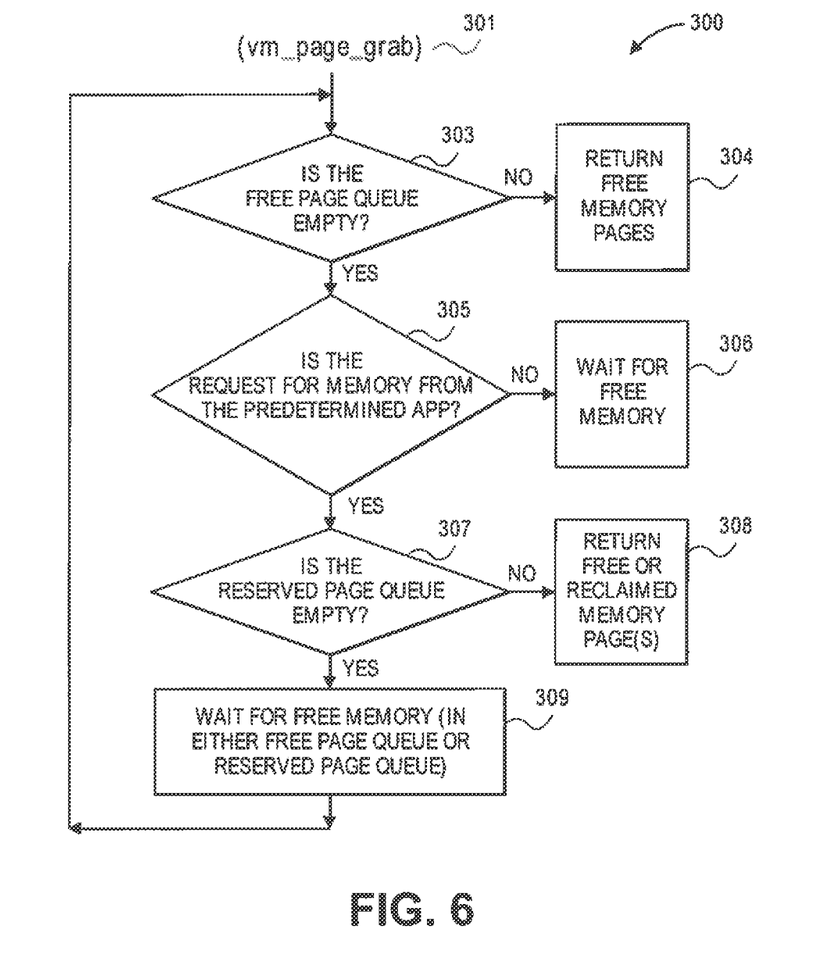
FIG. 6 is a flowchart which shows a method according to one embodiment described herein.

FIG. 6 shows a method 300 which can be performed by a memory management system, such as the memory manager module 151 which can use the set of queues 155. The method 300 can begin in response to a request to allocate or otherwise provide one or more pages of memory, wherein the request can originate from one or more application programs or system daemons or plug-ins, etc. The request 301 causes the memory manager in operation 303 to determine whether there are one or more free pages in the free page queue. If there are no free pages left in the free page queue then the free page queue is empty, and processing can proceed to operation 305. If on the other hand in operation 303 the memory management system determines that the free page queue is not empty then the memory management system returns, in operation 304, one or more free memory pages to the application or other process which requested the memory in request 301. Referring back to operation 305, the memory management system determines whether the request for memory is from the predetermined application (or plug-iris or extensions or daemons associated with the predetermined app and are provided the same privilege as the predetermined app). If the memory management system determines that the request is not from the predetermined app (or plug-ins, extensions, etc. given the same privilege) then processing proceeds to operation 306 in which the requesting app or process is required to wait for free memory. This wait will end in response to the wakeup which occurs in operation 365 shown in FIG. 7 and which will be described further below. When free pages become available for the process waiting in operation 306, they are provided to that process by the memory management system after that process is awakened by operation 365. Referring back to FIG. 6, if the memory management system in operation 305 determines that the request for memory is from the predetermined app (or associated processes, such as plug-ins, extensions or associated software libraries such as a media server) then, the memory management system proceeds to operation 307 in which it determines whether the reserved page queue is empty. If it is not, then, in operation 308, the memory management system returns free or reclaimed memory pages to the predetermined app (or associated processes). In the case of operation 307, "empty" means that there are some free memory pages in the reserved page queue or there are some reclaimable pages in the reserved page queue (e.g., read only content 208) which can be reclaimed without paging out the content from the reserved portion back to the non-volatile memory or preserving the content in any other way. In other words, in operation 308, the memory management system can quickly reclaim memory pages within the reserved portion and return those reclaimed memory pages for use by the predetermined app (or associated processes). Referring back to operation 307, if the memory management system determines that the reserved page queue is empty then processing proceeds to operation 309 in which the predetermined app waits for free memory either in the free page queue or the reserved page queue. This wait ends as a result of the wakeup in operation 361 shown in FIG. 7 after the memory reclamation systems have reclaimed a sufficient amount of memory pages. After the wait has ended then, the predetermined app can be awakened and provided with the newly reclaimed memory pages.

Figure 7:
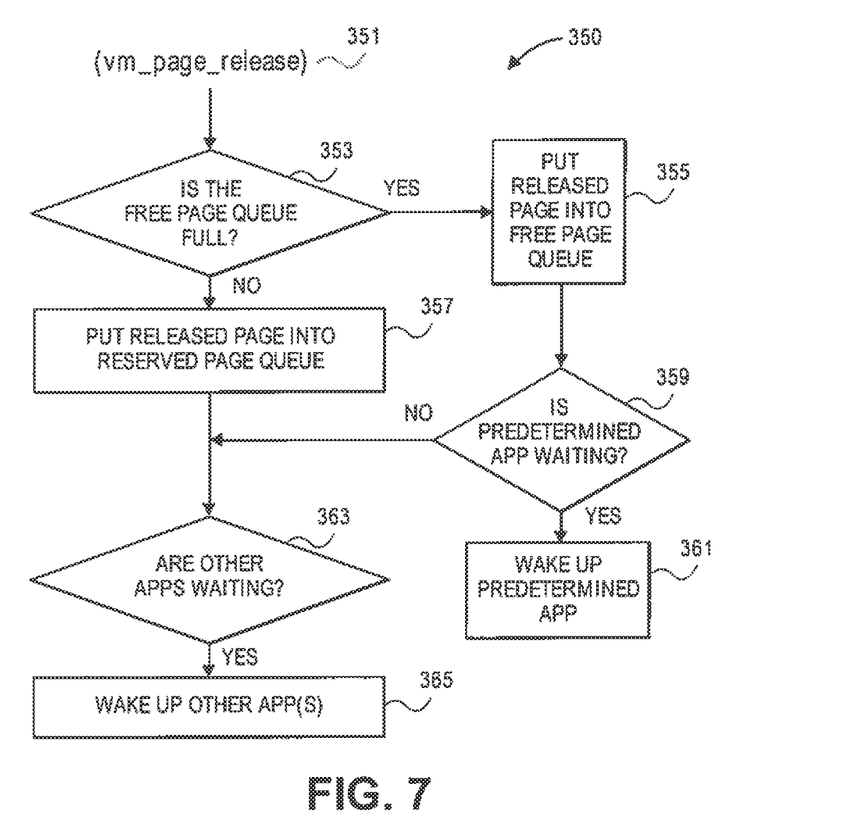
FIG. 7 is a flowchart which shows a method according to one embodiment when memory pages become available.

FIG. 7 shows a method 350 which results from the one or more memory reclaiming processes that can be used in conjunction with the embodiments described herein. For example, the use of compression or Jetsam or the paging out of "dirty" files or the quitting clone or more applications can result in the method 350 in response to request 351 which indicates to the memory management system that one or more memory pages have been released, in response to that request 351, the memory management system determines whether or not, in operation 353, the reserved page queue is full. If it is not, the memory management system puts the released page into the reserved page queue in operation 357. On the other hand, if it is full, then the released page is put, in operation 355, into the free page queue and processing proceeds from operation 355 to operation 359 in which the memory management system determines whether the predetermined app is waiting. If it is, then the predetermined app is awakened in operation 361 which causes free memory pages to be allocated to the predetermined app. If the memory management system determines operation 359 that the predetermined app is not waiting then processing proceeds to operation 363, which also follows operation 357 as shown in FIG. 7. In operation 363 the memory management system determines whether other applications are awaking, and if they are, processing proceeds to operation 365 in which the other apps which are waiting are awakened and are provided with free memory pages which were requested as described in conjunction with FIG. 6.

Figure 8:
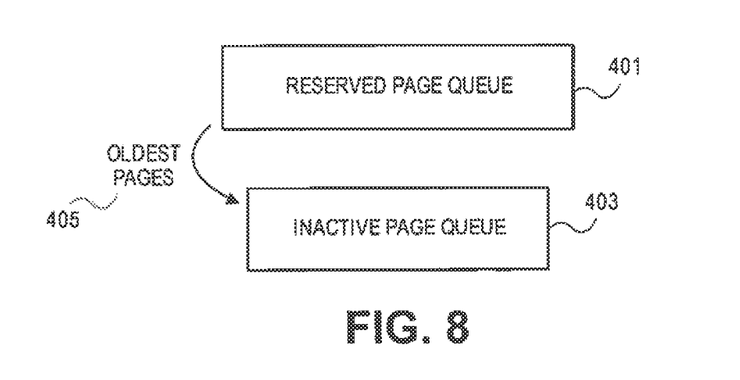
FIG. 8 shows one embodiment in which aged pages are moved from a reserved page queue into an inactive page queue.

In one embodiment, the memory management system can further integrate a reserved page queue into the flow of pages through the queues shown in FIG. 1 by moving oldest pages 405 from the reserved page queue 401 to the inactive page queue 403 as shown in FIG. 8. The reserved page queue 401 can be the reserved page queue 158 in FIG. 2, and the inactive page queue 403 can be the inactive page queue 159 and be managed by memory manager module 151. This moving of oldest pages 405 can occur, in one embodiment, if the reserved page queue contains too many pages.

Figure 9:
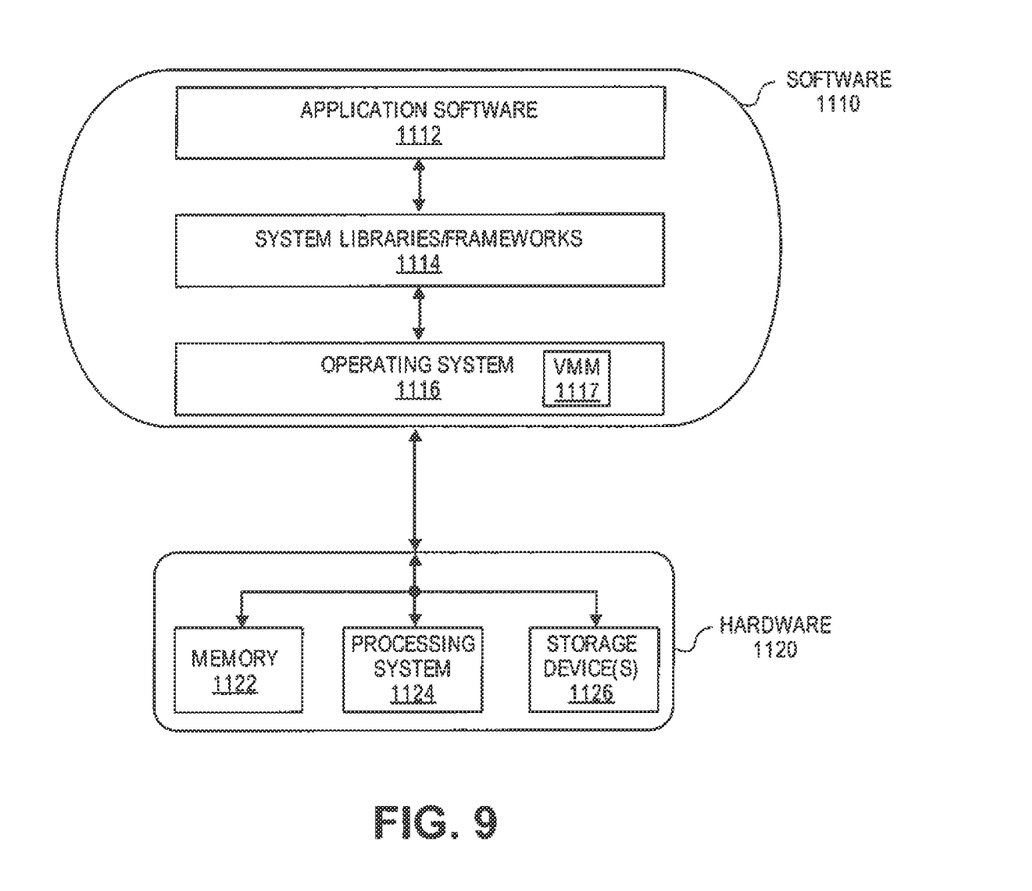
FIG. 9 is a block diagram of a system software architecture and hardware components according to one embodiment described herein.

FIG. 9 is a block diagram of system architecture for a data processing system, according to an embodiment. The data processing system includes various software 1110 and hardware 1120 components configured to support data processing. In one embodiment, software 1110 of the system can be used to implement the memory management system of FIG. 2. The hardware 1120 can be configured with components to provide a memory management system, such as the memory management system shown in FIG. 2. The hardware 1120 of the data processing system can include one or more memory devices 1122, a processing system 1124 including one or more processors, and one or more storage devices 1126.

A virtual memory manager VMM 1117 can provide memory management services, such as virtual memory mapping and paging. The operating system 1116 can configure the VMM 1117 to map addresses on the storage devices 1126 into memory, for example, to load binary objects for application software 1112 or system libraries or frameworks 1114, or to store or load compressed and compacted memory to or from a compressed freezer file, according to embodiments described herein.

The exemplary user application software 1112 may be any one of a plurality of user applications, such as a web browser, a document viewer, a picture viewer, a movie player, a word processing or text editing application, an email application, or other applications known in the art. In one embodiment, multiple applications and multiple software daemons can be executing in the background while another application is a foreground application.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic device.

Figure 10:
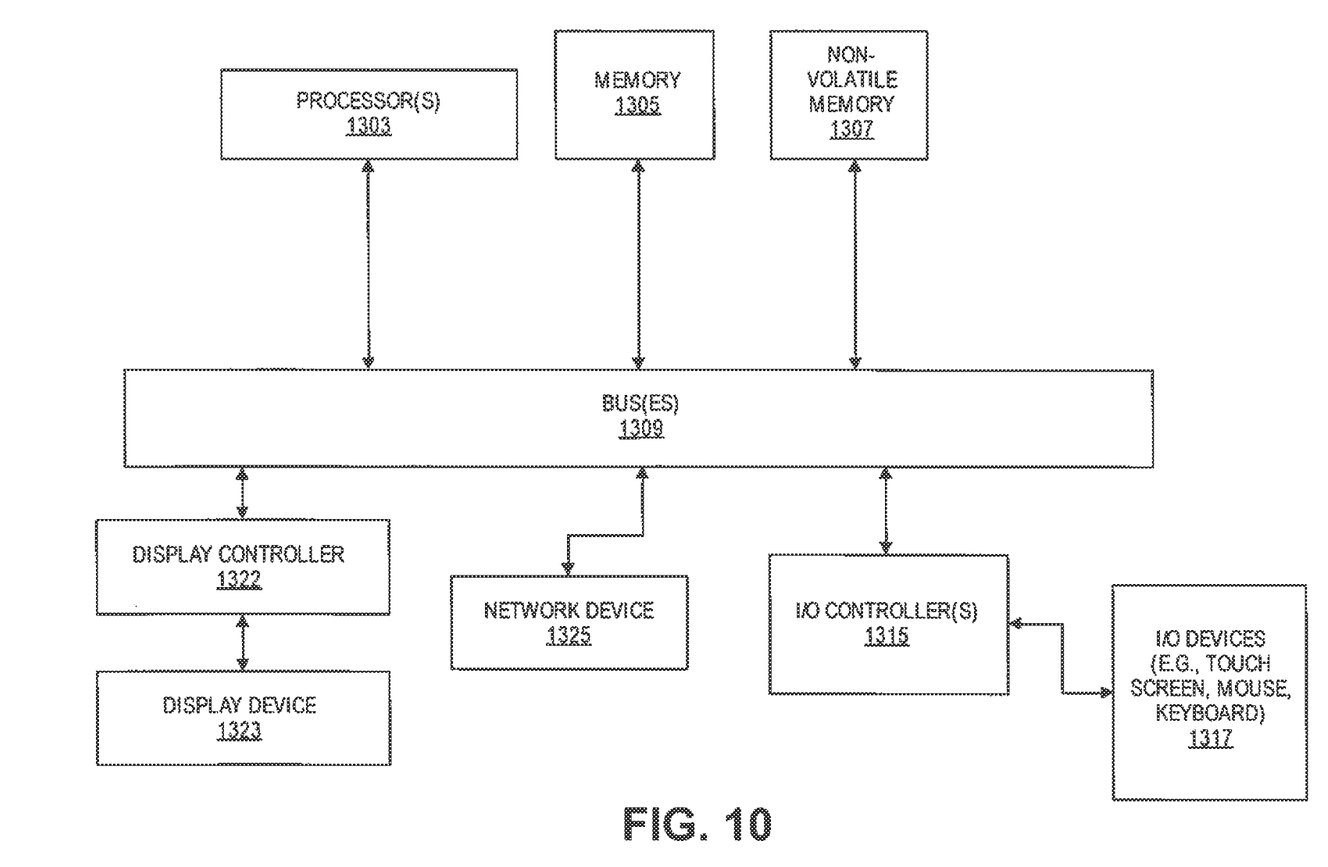
FIG. 10 is a block diagram of a data processing system which can be used with one or more embodiments described herein.

FIG. 10 is a block diagram of data processing system hardware according to an embodiment. Note that while FIG. 10 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown in FIG. 10 can also be used with the present invention.

As shown in FIG. 10, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the an and output devices (e.g. speakers). The input/output devices 1317 are coupled through one or more I/O controllers 1315 as is known in the art.

While FIG. 10 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art, in one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WI-FI, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g., DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

In the foregoing specification, specific exemplary embodiments have been described. It will be evident that various modifications may be made to those embodiments without departing from the broader spirit and scope set forth in the following claims. The specification and drawings are, accordingly, to he regarded in an illustrative sense rather than a restrictive sense.

What is claimed is:

1. A non-transitory machine readable medium storing executable program instructions which when executed by a data processing system cause the data processing system to perform a method comprising:

reserving a portion of volatile memory, on a mobile device, for use by at least one predetermined application, wherein the predetermined application is one of a plurality of applications on the mobile device, and wherein the reserving creates a reserved portion in the volatile memory, wherein the volatile memory comprises the reserved portion and another portion, and the mobile device maintains a reserved queue for the reserved portion, the reserved queue specifying, if available, free portions of the reserved portion in the volatile memory;

storing, in the reserved portion before the predetermined application is launched, content that is restricted as read only in a non-volatile memory on the mobile device, the storing further comprising reading the content from the non-volatile memory, on the mobile device, and then writing the content into the reserved portion in the volatile memory;

storing, in response to the predetermined application being launched, one or more of software code or data for the predetermined application in the volatile memory, wherein the storing of the one or more software code or data for the predetermined application comprises reading, from the non-volatile memory, the one or more software code or data for the predetermined application and then writing the one or more software code or data into the volatile memory, and wherein at least a portion of the one or more software code or data for the predetermined application is stored in a free portion of the volatile memory if available, as indicated by a free queue, before storing other portions of the one or more software code or data for the predetermined application in the reserved portion, and
wherein if no free portions of the volatile memory are available, as indicated by the free queue, and no free portions of the reserved portion are available, as indicated by the reserved queue, then, in response to launching the predetermined application, reclaiming memory pages within the reserved portion before reclaiming memory pages within other portions of the volatile memory,
wherein the free queue and the reserved queue are mutually exclusive.

2. The non-transitory machine readable medium as in claim 1, wherein the reclaiming of memory pages within the reserved portion is performed without performing a page out from the memory pages within the reserved portion to the non-volatile memory or preserving their content in any other way.

3. The non-transitory machine readable medium as in claim 2, wherein the reserving is performed at boot time when the mobile device is booting, and wherein the volatile memory is dynamic random access memory and the non-volatile memory comprises flash memory.

4. The non-transitory machine readable medium as in claim 1, wherein the content that is restricted as read only includes read only software libraries or other read only files.

5. The non-transitory machine readable medium as in claim 1, wherein the predetermined application is predetermined either: (a) at compile time of an operating system (OS) that includes a memory manager or (b) dynamically at run time based on either a user input or an OS selection, and wherein the predetermined application is a user application that runs in user memory space.

6. The non-transitory machine readable medium as in claim 1, wherein the predetermined application is a camera application that operates with an imaging system to capture one or more of a still image or a video.

7. The non-transitory machine readable medium as in claim 1, wherein a virtual memory (VM) manager maintains a set of queues including a free page queue, an active page queue and the reserved queue for the reserved portion and wherein the VM manager and a kernel enforce access permissions including a read only permission for read only content in the non-volatile memory.

8. The non-transitory machine readable medium as in claim 1, wherein the content that is restricted as read only includes read only software libraries that are stored in the non-volatile memory and are code signed with code signatures that can be validated before execution of the read only software libraries.

9. The non-transitory machine readable medium as in claim 1, wherein the method further comprises:
determining whether the predetermined application is classified as a predetermined application and wherein the method is performed on the mobile device in response to determining the predetermined application is classified as a predetermined application.

10. The non-transitory machine readable medium as in claim 1, wherein the predetermined application is classified as a predetermined application by an identifier that indicates the predetermined application has a status, relative to other applications in the plurality of applications, that reserves, for the predetermined application, use of the reserved portion of the volatile memory.

11. A method implemented by a data processing system, the method comprising:

reserving a portion of volatile memory, on a mobile device, for use by at least one predetermined application, wherein the predetermined application is one of a plurality of applications on the mobile device, and wherein the reserving creates a reserved portion in the volatile memory, wherein the volatile memory comprises the reserved portion and another portion, and the mobile device maintains a reserved queue for the reserved portion, the reserved queue specifying, if available, free portions of the reserved portion in the volatile memory;
storing, in the reserved portion before the predetermined application is launched, content that is restricted as read only in a non-volatile memory on the mobile device, the storing comprising reading the content from the non-volatile memory, on the mobile device, and then writing the content into the reserved portion in the volatile memory;
storing, in response to the predetermined application being launched, one or more of software code or data for the predetermined application in the volatile memory, wherein the storing of the one or more software code or data for the predetermined application comprises reading, from the non-volatile memory, the one or more software code or data for the predetermined application and then writing the one or more software code or data into the volatile memory, and
wherein at least a portion of the one or more software code or data for the predetermined application is stored in a free portion of the volatile memory if available, as indicated by a free queue, before storing other portions of the one or more software code or data for the predetermined application in the reserved portion, and
wherein if no free portions of the volatile memory are available, as indicated by the free queue, and no free portions of the reserved portion are available, as indicated by the reserved queue, then, in response to launching the predetermined application, reclaiming memory pages within the reserved portion before reclaiming memory pages within other portions of the volatile memory,
wherein the free queue and the reserved queue are mutually exclusive.

12. The method as in claim 11, wherein the reclaiming of memory pages within the reserved portion is performed without performing a page out from the memory pages within the reserved portion to the non-volatile memory.

13. The method as in claim 12, wherein the reserving is performed at boot time when the client device is booting, and wherein the volatile memory is dynamic random access memory and the non-volatile memory comprises flash memory.

14. The method as in claim 11, wherein the content that is restricted as read only includes read only software libraries or other read only files.

15. The method as in claim 11, wherein the predetermined application is predetermined either: (a) at compile time of an operating system (OS) that includes a memory manager or (b) dynamically at run time based on either a user input or an OS selection, and wherein the predetermined application is a user application that runs in user memory space.

16. The method as in claim 11, wherein the predetermined application is a camera application that operates with an imaging system to capture one or more of a still image or a video.

17. The method as in claim 11, wherein a virtual memory (VM) manager maintains a set of queues including a free page queue, an active page queue and the reserved queue for the reserved portion and wherein the VM manager and a kernel enforce access permissions including a read only permission for read only content in the non-volatile memory.

18. The method as in claim 11, wherein the content that is restricted as read only includes read only software libraries that are stored in the non-volatile memory and are code signed with code signatures that can be validated before execution of the read only software libraries.

19. The method as in claim 11, wherein the method further comprises:
    determining whether the predetermined application is classified as a predetermined application and wherein the method is performed on the mobile device in response to determining the predetermined application is classified as a predetermined application.

20. The method as in claim 11, wherein the predetermined application is classified as a predetermined application by an identifier that indicates the predetermined application has a status, relative to other applications in the plurality of applications, that reserves, for the predetermined application, use of the reserved portion of the volatile memory.

21. A non-transitory machine readable medium storing executable program instructions which when executed by a data processing system cause the data processing system to perform a method comprising:
    determining from a free page queue, in response to a request for a free page of memory in volatile memory, whether a memory page is available for use by an application;
    providing to the application a free page if the free page queue is not empty;
    determining if the application is classified as a predetermined application;
    providing to the predetermined application, if the free page queue is empty and the application is classified as the predetermined application, a free page from a reserved page queue for a reserved portion of volatile memory on the data processing system, the reserved page queue specifying free portions, if available, of the reserved portion in volatile memory, wherein the free page queue and the reserved page queue are mutually exclusive, and
    wherein if no free portions of the volatile memory are available, as indicated by the free page queue, and no free portions of the reserved portion are available, as indicated by the reserved page queue, then, in response to launching the predetermined application, reclaiming memory pages within the reserved portion instead of waiting for the data processing system to reclaim memory pages within other portions of the volatile memory.

22. The non-transitory machine readable medium as in claim 21, wherein the state of not empty indicates that free memory pages are available for use.

23. The non-transitory machine readable medium as in claim 21, wherein content that is restricted as read only is also stored in the reserved portion.

24. The non-transitory machine readable medium as in claim 21, wherein the content in the reserved portion, before being reclaimed, is restricted as read only memory in a non-volatile memory on the data processing system and wherein the predetermined application is a camera application.

25. The non-transitory machine readable medium as in claim 21, wherein the predetermined application is classified as a predetermined application by an identifier that indicates the predetermined application has a status, relative to other applications in the plurality of applications, that reserves, for the predetermined application, use of the reserved portion of the volatile memory.

* * * * *